United States Patent [19]

Nadas et al.

[11] Patent Number: 4,926,488

[45] Date of Patent: May 15, 1990

[54] NORMALIZATION OF SPEECH BY ADAPTIVE LABELLING

[75] Inventors: Arthur J. Nadas, Rock Tavern; David Nahamoo, White Plains, both of N.Y.

[73] Assignee: International Business Machines Corporation, Armonk, N.Y.

[21] Appl. No.: 71,687

[22] Filed: Jul. 9, 1987

[51] Int. Cl.[5] .......................... G10L 5/04; G10L 9/16

[52] U.S. Cl. .......................................... 381/41; 381/46

[58] Field of Search .................. 364/513.5; 381/41-50

[56] References Cited

U.S. PATENT DOCUMENTS

| | | | |
|---|---|---|---|
| 2,938,079 | 5/1960 | Flanagan | 381/50 |
| 3,673,331 | 6/1972 | Hair et al. | 381/42 |
| 3,770,891 | 11/1973 | Kalfaian | 381/42 |
| 3,969,698 | 7/1976 | Bollinger et al. | 381/43 |
| 4,227,046 | 10/1980 | Nakajima et al. | 381/47 |
| 4,256,924 | 3/1981 | Sakoe | 381/43 |
| 4,282,403 | 8/1981 | Sakoe | 364/513.5 |
| 4,292,471 | 9/1981 | Kuhn et al. | 381/42 |
| 4,394,538 | 7/1983 | Warren et al. | 381/43 |
| 4,519,094 | 5/1985 | Brown et al. | 381/43 |
| 4,559,604 | 12/1985 | Ichikawa et al. | 364/513.5 |
| 4,597,098 | 6/1986 | Noso et al. | 381/46 |
| 4,601,054 | 7/1986 | Watari et al. | 381/43 |
| 4,658,426 | 4/1987 | Chabries et al. | 381/47 |
| 4,718,094 | 1/1988 | Bahl et al. | 381/43 |
| 4,720,802 | 1/1988 | Damoulakis et al. | 364/513.5 |
| 4,752,957 | 6/1988 | Maeda | 381/42 |
| 4,802,224 | 1/1989 | Shiraki et al. | 381/41 |
| 4,803,729 | 2/1989 | Baker | 381/43 |

OTHER PUBLICATIONS

Paul, "An 800 PBS Adaptive Vector Quantization Vocoder Using a Perceptual Distance Measure", ICASSP '83 Boston, pp. 73–76.

Burton et al., "Isolated-Word Recognition Using Multisection Vector Quantization Codebooks", IEEE Trans. on ASSP, vol. 33, No. 4, Aug. 1985, pp. 837–849.

Technical Disclosure Bulletin, vol. 28, No. 11, Apr. 1986, pp. 5401–5402, by K. Sugawara, Entitled "Method for Making Confusion Matrix by DP Matching".

Shíkano, K., et al., "Speaker Adaptation Through Vector Quantization", *ICASSP* '86, Tokyo, pp. 2643–2646.

Tappert, C. C., et al., "Fast Training Method for Speech Recognition Systems", *IBM Tech. Discl. Bull.*, vol. 21, No. 8, Jan. 1979, pp. 3413–3414.

Technical Disclosure Bulletin, vol. 28, No. 11, Apr. 1986, pp. 5401–5402, by K. Sugawara, Entitled, "Method for Making Confusion Matrix by DP Matching".

*Primary Examiner*—Gary V. Harkcom
*Assistant Examiner*—David D. Knepper
*Attorney, Agent, or Firm*—Marc A. Block; Marc D. Schechter

[57] ABSTRACT

In a speech processor system in which prototype vectors of speech are generated by an acoustic processor under reference noise and known ambient conditions and in which feature vectors of speech are generated during varying noise and other ambient and recording conditions, normalized vectors are generated to reflect the form the feature vectors would have if generated under the reference conditions. The normalized vectors are generated by: (a) applying an operator function $A_i$ to a set of feature vectors x occurring at or before time interval i to yield a normalized vector $y_i = A_i(x)$; (b) determining a distance error vector $E_i$ by which the normalized vector is projectively moved toward the closest prototype vector to the normalized vector $y_i$; (c) up-dating the operator function for next time interval to correspond to the most recently determined distance error vector; and (d) incrementing i to the next time interval and repeating steps (a) through (d) wherein the feature vector corresponding to the incremented i value has the most recent up-dated operator function applied thereto. With successive time intervals, successive normalized vectors are generated based on a successively up-dated operator function. For each normalized vector, the closest prototype thereto is associated therewith. The string of normalized vectors or the string of associated prototypes (or respective label identifiers thereof) or both provide output from the acoustic processor.

8 Claims, 8 Drawing Sheets

PROTOTYPE SPACE = $\{\vec{P}_1, \vec{P}_2, \ldots, \vec{P}_{200}\}$

INPUT FEATURE VECTORS = $\{\vec{X}_1, \vec{X}_2, \vec{X}_3, \vec{X}_4, \vec{X}_5, \ldots\}$ OUTPUT FEATURE VECTORS = $\{\vec{X}_1, \vec{X}_2, \vec{X}_3, \vec{X}_4, \vec{X}_5, \ldots\}$ FENEME STRING = $\{P_{11}, P_{11}, P_{11}, P_{11}, P_{11}, \ldots, P_{11}\}$ PROTOTYPE SPACE = $\{ \vec{P}_1, \vec{P}_2, \ldots, \vec{P}_{200} \}$ INPUT FEATURE VECTORS = $\{ \vec{X}_1, \vec{X}_2, \vec{X}_3, \vec{X}_4, \vec{X}_5, \ldots \}$ OUTPUT FEATURE VECTORS = $\{ \vec{Y}_1, \vec{Y}_2, \vec{Y}_3, \vec{Y}_4, \vec{Y}_5, \ldots \}$ FENEME STRING = $\{ P_{11}, P_{11}, P_3, P_3, P_{56}, \ldots \}$

NORMALIZATION OF SPEECH BY ADAPTIVE LABELLING

BACKGROUND OF THE INVENTION

I. Field of the Invention

In general, the present invention relates to speech processing (such as speech recognition). In particular, the invention relates to apparatus and method for characterizing speech as a string of spectral vectors and/or labels representing predefined prototype vectors of speech.

II. Description of the Problem

In speech processing, speech is generally represented by an n-dimensional space in which each dimension corresponds to some prescribed acoustic feature. For example, each component may represent a amplitude of energy in a respective frequency band. For a given time interval of speech, each component will have a respective amplitude. Taken together, the n amplitudes for the given time interval represent an n-component vector in the n-dimensional space.

Based on a known sample text uttered during a training period, the n-dimensional space is divided into a fixed number of regions by some clustering algorithm. Each region represents sounds of a common prescribed type: sounds having component values which are within regional bounds. For each region, a prototype vector is defined to represent the region.

The prototype vectors are defined and stored for later processing. When an unknown speech input is uttered, for each time interval, a value is measured or computed for each of the n components, where each component is referred to as a feature. The values of all of the features are consolidated to form an n-component feature vector for a time interval.

In some instances, the feature vectors are used in subsequent processing.

In other instances, each feature vector is associated with one of the predefined prototype vector and the associated prototype vectors are used in subsequent processing.

In associating prototype vectors with feature vectors, the feature vector for each time interval is typically compared to each prototype vector. Based on a predefined closeness measure, the distance between the feature vector and each prototype vector is determined and the closest prototype vector is selected.

A speech type of event, such as a word or a phoneme, is characterized by a sequence of feature vectors in the time period over which the speech event was produced. Some prior art accounts for temporal variations in the generation of feature vector sequences. These variations may result from differences in speech between speakers or for a single speaker speaking at different times. The temporal variations are addressed by a process referred to as time warping in which time periods are stretched or shrunk so that the time period of a feature vector sequence conforms to the time period of a reference prototype vector sequence, called a template. Oftentimes, the resultant feature vector sequence is styled as a "time normalized" feature vector sequence.

Because feature vectors or prototype vectors (or representations thereof) associated with the feature vectors or both are used in subsequent speech processing, the proper characterization of the feature vectors and proper selection of the closest prototype vector for each feature vector is critical.

The relationship between a feature vector and the prototype vectors has normally, in the past, been static; there has been a fixed set of prototype vectors and a feature vector based on the values of set features.

However, due to ambient noise, signal drift, changes in the speech production of the talker, differences between talkers or a combination of these, signal traits may vary over time. That is, the acoustic traits of the training data from which the prototype vectors are derived may differ from the acoustic traits of the data from which the test or new feature vectors are derived. The fit of the prototype vectors to the new data traits is normally not as good as to the original training data. This affects the relationship between the prototype vectors and later-generated feature vectors, which results in a degradation of performance in the speech processor.

SUMMARY OF THE INVENTION

It is an object of the present invention to provide apparatus and method for adapting feature vectors in order to account for noise and other ambient conditions as well as intra and inter speaker variations which cause the speech data traits from which feature vectors are derived to vary from the training data traits from which the prototypes are derived.

In particular, each feature vector $\vec{X}_i$ generated at a time interval i is transformed into a normalized vector $y_i$ according to the expression:

$$\vec{y}_i = A_i(x)$$

where x is a set of one or more feature vectors at or before time interval i and where $A_i$ is an operator function which includes a number of parameters. According to the invention, the values of the parameters in the operator function are up-dated so that the vector $\vec{y}$ (at a time interval i) is more informative than the feature vector $\vec{x}$ (at a time interval i) with respect to the representation of the acoustic space characterized by an existing set of prototypes. That is, the transformed vectors $\vec{y}_i$ more closely correlate to the training data upon which the prototype vectors are based than do the feature vectors $\vec{x}_i$.

Generally, the invention includes transforming a feature vector $\vec{x}_i$ to a normalized vector $\vec{y}_i$ according to an operator function; determining the closest prototype vector for $\vec{y}_i$; altering the operator function in a manner which would move $\vec{y}_i$ closer to the closest prototype thereto; and applying the altered operator function to the next feature vector in the transforming thereof to a normalized vector. Stated more specifically, the present invention provides that parameters of the operator function be first initialized. The operator function $A_0$ at the first time interval i=O is defined with the initialized parameters and is applied to a first vector $\vec{x}_0$ to produce a transformed vector $\vec{y}_0$. For $\vec{y}_0$, the closest prototype vector is selected based on an objective closeness function D. The objective function D is in terms of the parameters used in the operator function. Optimizing the function D with respect to the various parameters (e.g., determining, with a "hill-climbing" approach, a value for each parameter at which the closeness function is maximum), up-dated values for the parameters are determined and incorporated into the operator function for the next time interval i=1. The adapted operator function $A_1$ is applied to the next feature vector $\vec{x}_1$ to produce a normalized vector $\vec{y}_1$. For the normalized vector $\vec{y}_1$, the closest prototype vector is selected. The objective function D is again optimized with respect to the various parameters to determine up-dated values for the parameters. The operator function $A_2$ is then defined in terms of the up-dated parameter values.

With each successive feature vector, the operator function parameters are up-dated from the previous values thereof.

In accordance with the invention, the following improved outputs are generated. One output corresponds to "normalized" vectors $\vec{y}_i$. Another output corresponds to respective prototype vectors (or label representations thereof) associated with the normalized vectors.

When a speech processor receives continuously normalized vectors $\vec{y}_i$ as input rather than the raw feature vectors $\vec{x}_i$, the degradation of performance is reduced. Similarly, for those speech processors which receive successive prototype vectors from a fixed set of prototype vectors and/or label representations as input, performance is improved when the input prototype vectors are selected based on the transformed vectors rather than raw feature vectors.

DESCRIPTION OF THE INVENTION

Figure 1:
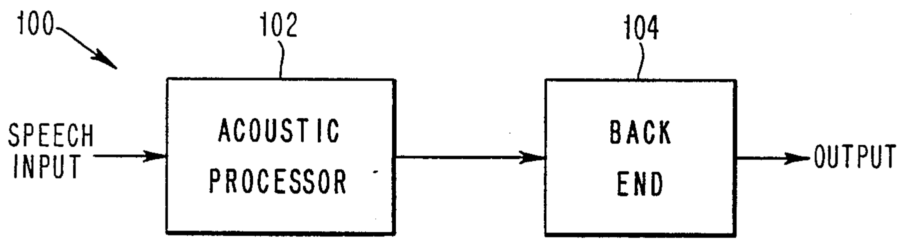
FIG. 1 is a general block diagram of a speech processing system.

In FIG. 1, the general diagram for a speech processing system 100 is shown. An acoustic processor 102 receives as input an acoustic speech waveform and converts it into data which a back-end 104 processes for a prescribed purpose. Such purposes are suggested in FIG. 2.

Figure 2:
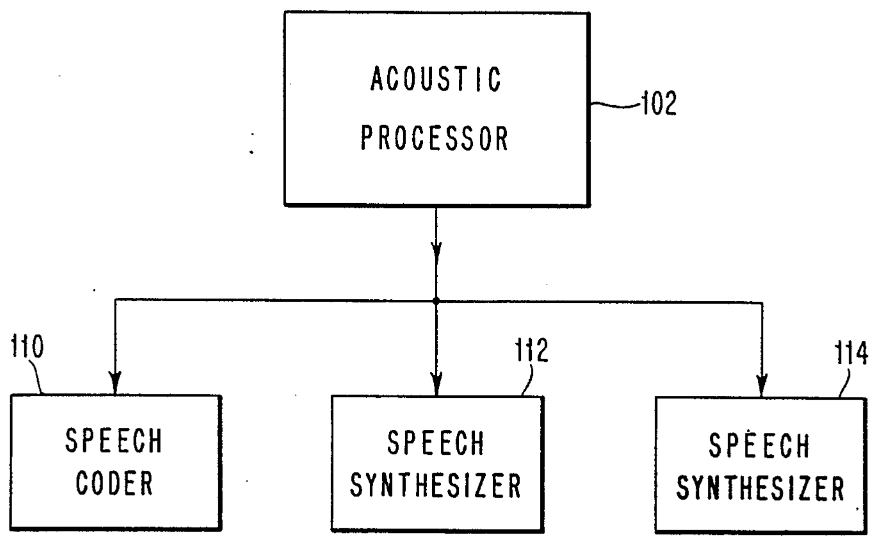
FIG. 2 is a general block diagram of a speech processing system with designated back ends.

In FIG. 2, the acoustic processor 102 is shown generating output to three different elements. The first element is a speech coder 110. The speech coder 110 alters the form of the data exiting the acoustic processor 102 to provide a coded representation of speech data. The coded data can be transferred more rapidly and can be contained in less storage than the original uncoded data.

The second element receiving input from the acoustic processor 102 is a speech synthesizer 112. In some environments, it is desired to enhance a spoken input by reducing noise which accompanies the speech signal. In such environments, a speech waveform is passed through an acoustic processor 102 and the data therefrom enters a speech synthesizer 112 which provides a speech output with less noise.

The third element corresponds to a speech recognizer 114 which converts the output of the acoustic processor 102 into text format. That is, the output from the acoustic processor 102 is formed into a sequence of words which may be displayed on a screen, processed by a text editor, used in providing commands to machinery, stored for later use in a textual context, or used in some other text-related manner.

Various examples of the three elements are found in the prior technology. In that the present invention is mainly involved with generating input to these various elements, further details are not provided. It is noted, however, that a preferred use of the invention is in conjunction with a "Speech Recognition System" invented by L. Bahl, S. V. DeGennaro, and R. L. Mercer for which a patent application was filed on Mar. 27, 1986 (S.N. 06/845155) now Pat. No. 4,718,094. The earlier filed application is assigned to the IBM Corporation, the assignee of the present application, and is incorporated herein by reference to the extent necessary to provide background disclosure of a speech recognizer which may be employed with the present invention.

Figure 3:
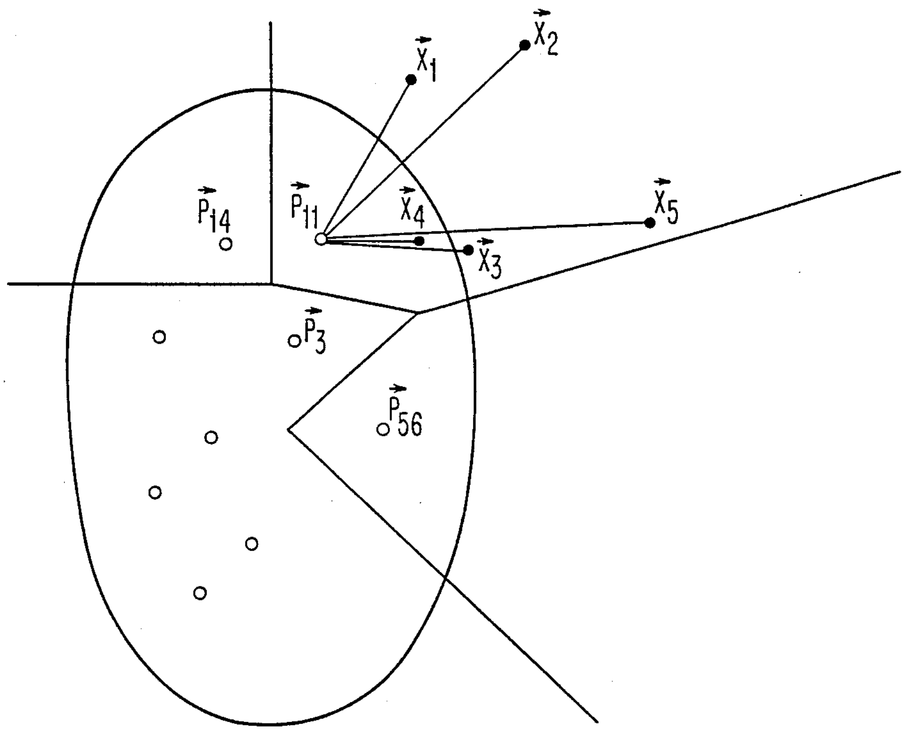
FIG. 3 is a drawing illustrating acoustic space partitioned into regions, where each region has a representative prototype included therein. Feature vectors are also shown, each being associated with a "closest" prototype vector.

At this point, it is noted that the present invention may be used with any speech processing element which receives as input either feature vectors or prototype vectors (or labels representative thereof) associated with feature vectors. By way of explanation, reference is made to FIG. 3. In FIG. 3, speech is represented by an acoustic space. The acoustic space has n dimensions and is partitioned into a plurality of regions (or clusters) by any of various known techniques referred to as "clustering". In the present embodiment, acoustic space is divided into 200 non-overlapping clusters which are preferably Voronoi regions. FIG. 3 is a two-dimensional representation of part of the acoustic space.

For each region in the acoustic space, there is defined a respective, representative n-component prototype vector. In FIG. 3, four of the 200 prototype vectors $\vec{P}_3$, $\vec{P}_{11}$, $\vec{P}_{14}$, and $\vec{P}_{56}$ are illustrated. Each prototype represents a region which, in turn, may be viewed as a "sound type." Each region, it is noted, contains vector points for which the n components —when taken together—are somewhat similar.

In a first embodiment, the n components correspond to energy amplitudes in n distinct frequency bands. The points in a region represent sounds in which the n frequency band amplitudes are collectively within regional bounds.

Alternatively, in another earlier filed patent application commonly assigned to the IBM Corporation, which is incorporated herein by reference, the n components are based on a model of the human ear. That is, a neural firing rate in the ear is determined for each of n frequency bands; the n neural firing rates serving as the n components which define the acoustic space, the prototype vectors, and feature vectors used in speech recognition. The sound types in this case are defined based on the n neural firing rates, the points in a given region having somewhat similar neural firing rates in the n frequency bands. The prior application entitled "Nonlinear Signal Processing in a Speech Recognition System", U.S.S.N. 06/665401, was filed on Oct. 26, 1984 and was invented by J. Cohen and R. Bakis.

Referring still to FIG. 3, five feature vectors at respective successive time intervals i=1, i=2, i=3, i=4, and i=5 are shown as $\vec{X}_1$, $\vec{X}_2$, $\vec{X}_3$, $\vec{X}_4$, and $\vec{X}_5$, respectively. According to standard prior art methodology, each of the five identified feature vectors would be assigned to the Voronoi region corresponding to the prototype vector $\vec{P}_{11}$.

The two selectable outputs for a prior art acoustic processor would be (1) the feature vectors $\vec{X}_1$, $\vec{X}_2$, $\vec{X}_3$, $\vec{X}_4$, and $\vec{X}_5$ themselves and (2) the prototypes associated therewith, namely $\vec{P}_{11}$, $\vec{P}_{11}$, $\vec{P}_{11}$, $\vec{P}_{11}$, $\vec{P}_{11}$, respectively. It is noted that each feature vector $\vec{X}_1$, $\vec{X}_2$, $\vec{X}_3$, $\vec{X}_4$, and $\vec{x}_5$ is displaced from the prototype vector $\vec{P}_{11}$ by some considerable deviation distance; however the prior technology ignores the deviation distance.

Figure 4:
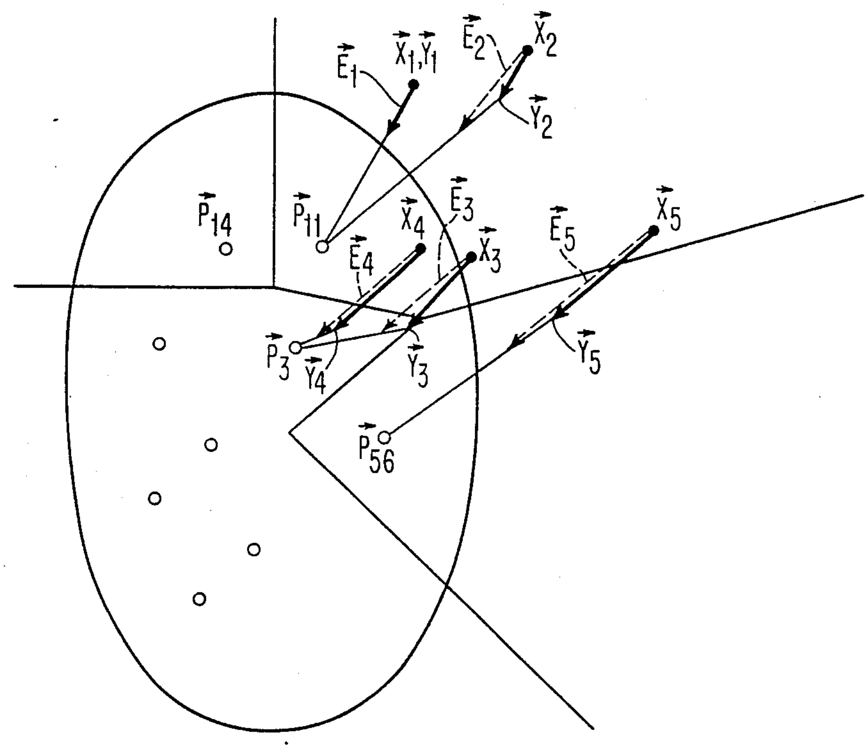
FIG. 4 is a drawing illustrating acoustic space partitioned into regions, where each region has a representative prototype included therein. Feature vectors are shown transformed according to the present invention into normalized vectors which are each associated with a "closest" prototype vector.

In FIG. 4, the effect underlying the present invention is illustrated. With each feature vector, at least part of the deviation distance is considered in generating more informative vector outputs for subsequent speech coding, speech synthesis, or speech recognition processing. Looking first at feature vector $\vec{x}_1$, a transformation is formed based on an operator function $A_1$ to produce a transformed normalized vector $\vec{y}_1$. The operator function is defined in terms of parameters which, at time interval i=1, are initialized so that $\vec{y}_1=\vec{x}_1$ in the FIG. 4 embodiment; $\vec{x}_1$ and $\vec{y}_1$ are directed to the same point.

It is observed that initialization may be set to occur at time interval i=0 or i=1 or at other time intervals depending on convention. In this regard, in FIG. 4 initialization occurs at time interval i=1; in other parts of the description herein initialization occurs at time interval i=0.

Based on a predefined objective function, an error vector $\vec{E}_1$ is determined. In FIG. 4, $\vec{E}_1$ is the difference vector of projected movement of $\vec{y}_1$ in the direction of the closest prototype thereto. (The meaning of "closeness+ is discussed hereinbelow.) $\vec{E}_1$ may be viewed as a determined error vector for the normalized vector $\vec{y}_1$ at time interval i=1.

Turning next to feature vector $\vec{x}_2$, it is noted that $\vec{y}_2$ is determined by simply vectorally adding the $\vec{E}_1$ error vector to feature vector $\vec{X}_2$. A projected distance vector of movement of $\vec{y}_2$ toward the prototype associated therewith (in this case prototype $\vec{P}_{11}$) is then computed according to a predefined objective function. The result of adding (1) the computed projected distance vector from $\vec{y}_2$ onto (2) the error vector $\vec{E}_1$ (extending from the feature vector $\vec{x}_2$) is an error vector $\vec{E}_2$ for time interval i=2. The error vector $\vec{E}_2$ is shown in FIG. 4 by a dashed line arrow.

Turning next to feature vector $\vec{x}_3$, the accumulated error vector $\vec{E}_2$ is shown being added to vector $\vec{x}_3$ in order to derive the normalized vector $\vec{y}_3$. Significantly, it is observed that $\vec{y}_3$ is in the region represented by the prototype $\vec{P}_3$. A projected move of $\vec{y}_3$ toward the prototype associated therewith is computed based on an objective function. The result of adding (1) the computed projected distance vector from $\vec{y}_3$ onto (2) the error vector $\vec{E}_2$ (extending from the feature vector $\vec{X}_3$) is a next error vector $\vec{E}_3$ for time interval i=3. The error vector $\vec{E}_3$ in effect builds from the projected errors of previous feature vectors.

Referring still to FIG. 4, it is observed that error vector $\vec{E}_3$ is added to feature vector $\vec{x}_4$ to provide a transformed normalized vector $\vec{y}_4$, which is projected a distance toward the prototype associated therewith. $\vec{y}_4$ is in the region corresponding to prototype $\vec{P}_3$; the projected move is thus toward prototype vector $\vec{P}_3$ by a distance computed according to an objective function. Error vector $\vec{E}_4$ is generated and is applied to feature vector $\vec{x}_5$ to yield $\vec{y}_5$. $\vec{y}_5$ is in the region corresponding to prototype vector $\vec{P}_{56}$; the projected move of $y_5$ is thus toward that prototype vector.

FIG. 4, each feature vector $\vec{x}_i$ is transformed into a normalized vector $\vec{y}_i$. It is the normalized vectors which serve as one output of the acoustic processor 102, namely $\vec{y}_1\vec{y}_2\vec{y}_3\vec{y}_4\vec{y}_5$. Each normalized vector, in turn, has an associated prototype vector. A second output of the acoustic processor 102 is the associated prototype vector for each normalized vector. In the FIG. 4 example, this second type of output would include the prototype vector string $\vec{P}_{11}\vec{P}_{11}\vec{P}_3\vec{P}_3\vec{P}_{56}$. Alternatively, assigning each prototype a label (or "feneme") which identifies each prototype vector by a respective number, the second output may be represented by a string such as 11,11,3,3,56 rather than the vectors themselves.

Figure 5:
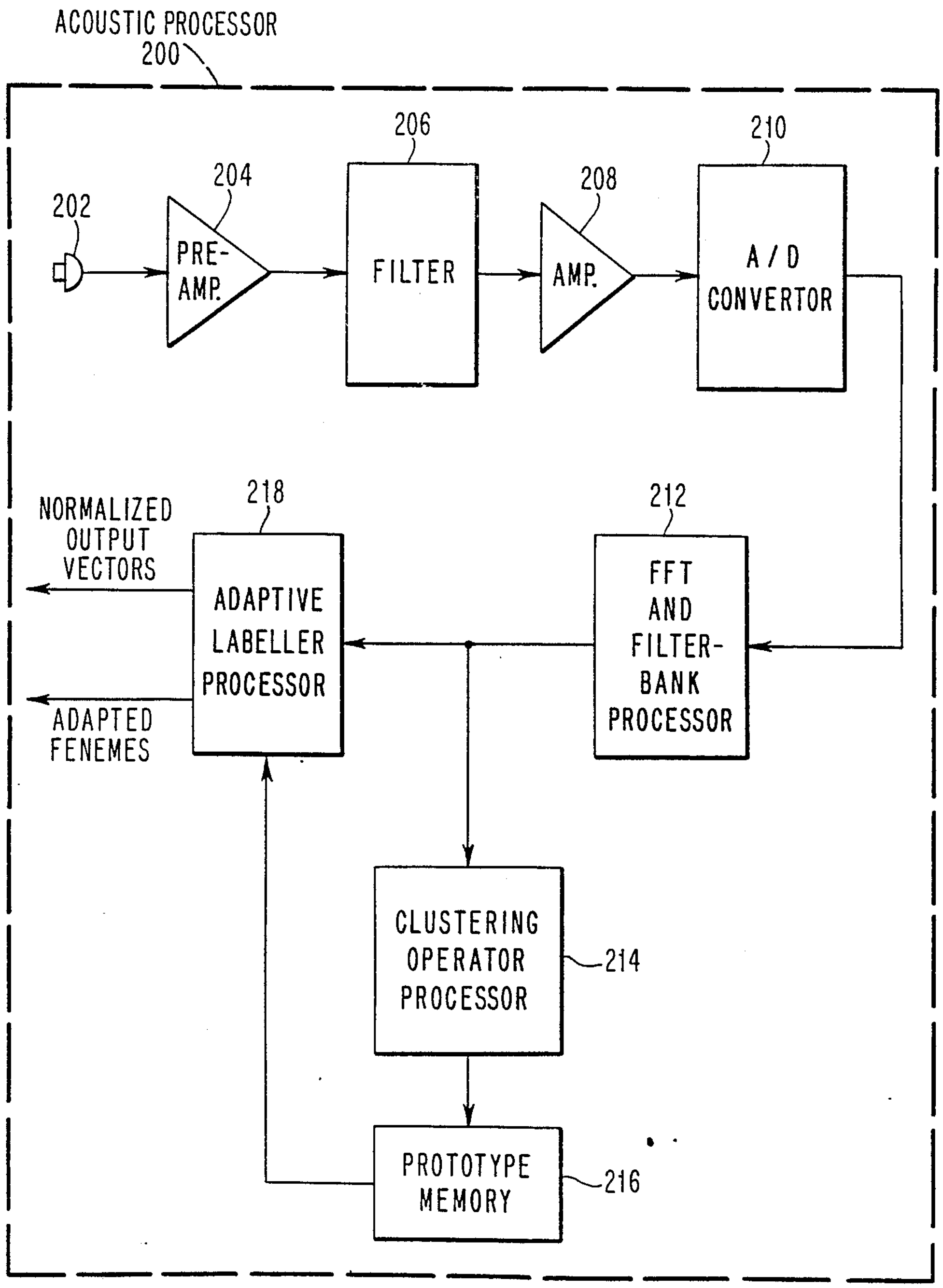
FIG. 5 is a block diagram showing an acoustic processor which embodies the adaptive labeller of the present invention.

In FIG. 5, an acoustic processor 200 which embodies the present invention is illustrated. A speech input enters a microphone 202, such as a Crown PZM microphone. The output from the microphone 202 passes through a pre-amplifier 204, such as a Studio Consultants Inc. pre-amplifier, enroute to a filter 206 which operates in the 200 Hz to 8 KHz range. (Precision Filters markets a filter and amplifier which may be used for elements 206 and 208.) The filtered output is amplified in amplifier 208 before being digitized in an A/D convertor 210. The convertor 210 is a 12-bit, 100 kHz analog-to-digital convertor. The digitized output passes through a Fast Fourier Transform FFT/Filter Bank Stage 212 (which is preferably an IBM 3081 Processor). The FFT/Filter Bank Stage 212 separates the digitized output of the A/D convertor 210 according to frequency bands. That is, for a given time interval, a value is measured or computed for each frequency band based on a predefined characteristic (e.g., the neural firing rate mentioned hereinabove). The value for each of the frequency bands represents one component of a point in the acoustic space. For 20 frequency bands, the acoustic space has n=20 dimensions and each point has 20 components.

During a training period in which known sounds are uttered, the characteristic(s) for each frequency band is measured or computed at successive time intervals. Based on the points generated during the training period, in response to known speech inputs, acoustic space is divided into regions. Each region is represented by a prototype vector. In the present discussion, a prototype vector is preferably defined as a fully specified probability distribution over the n-dimensional space of possible acoustic vectors.

A clustering operator 214 (e.g., an IBM 3081 processor) determines how the regions are to be defined, based on the training data. The prototype vectors which represent the regions, or clusters, are stored in a memory 216. The memory 216 stores the components of each prototype vector and, preferably, stores a label (or feneme) which uniquely identifies the prototype vector.

Preferably, the clustering operator 214 divides the acoustic space into 200 clusters, so that there are 200 prototype vectors which are defined based on the training data. Clustering and storing respective prototypes for the clusters are discussed in prior technology.

During the training period, the FFT/Filter Bank Stage 212 provides data used in clustering and forming prototypes. After the training period, the FFT/Filter Bank Stage 212 provides its output to an adaptive labeller 218 (which preferably comprises an IBM 3081 processor). After the training period and the prototypes are defined and stored, unknown speech inputs (i.e., an unknown acoustic waveform) are uttered into the microphone 202 for processing. The FFT/Filter Bank Stage 212 produces an output for each successive time interval ($i=1,2,3, \ldots$), the output having a value for each of the $n=20$ frequency bands. The 20 values, taken together, represent a feature vector. The feature vectors enter the adaptive labeller 218 as a string of input feature vectors.

The other input to the adaptive labeller 218 is from the prototype memory 216. The adaptive labeller 218, in response to an input feature vector, provides as output: (1) a normalized output vector and (2) a label corresponding to the prototype vector associated with a normalized output vector. At each successive time interval, a respective normalized output vector and a corresponding label (or feneme) is output from the adaptive labeller 218.

Figure 6:
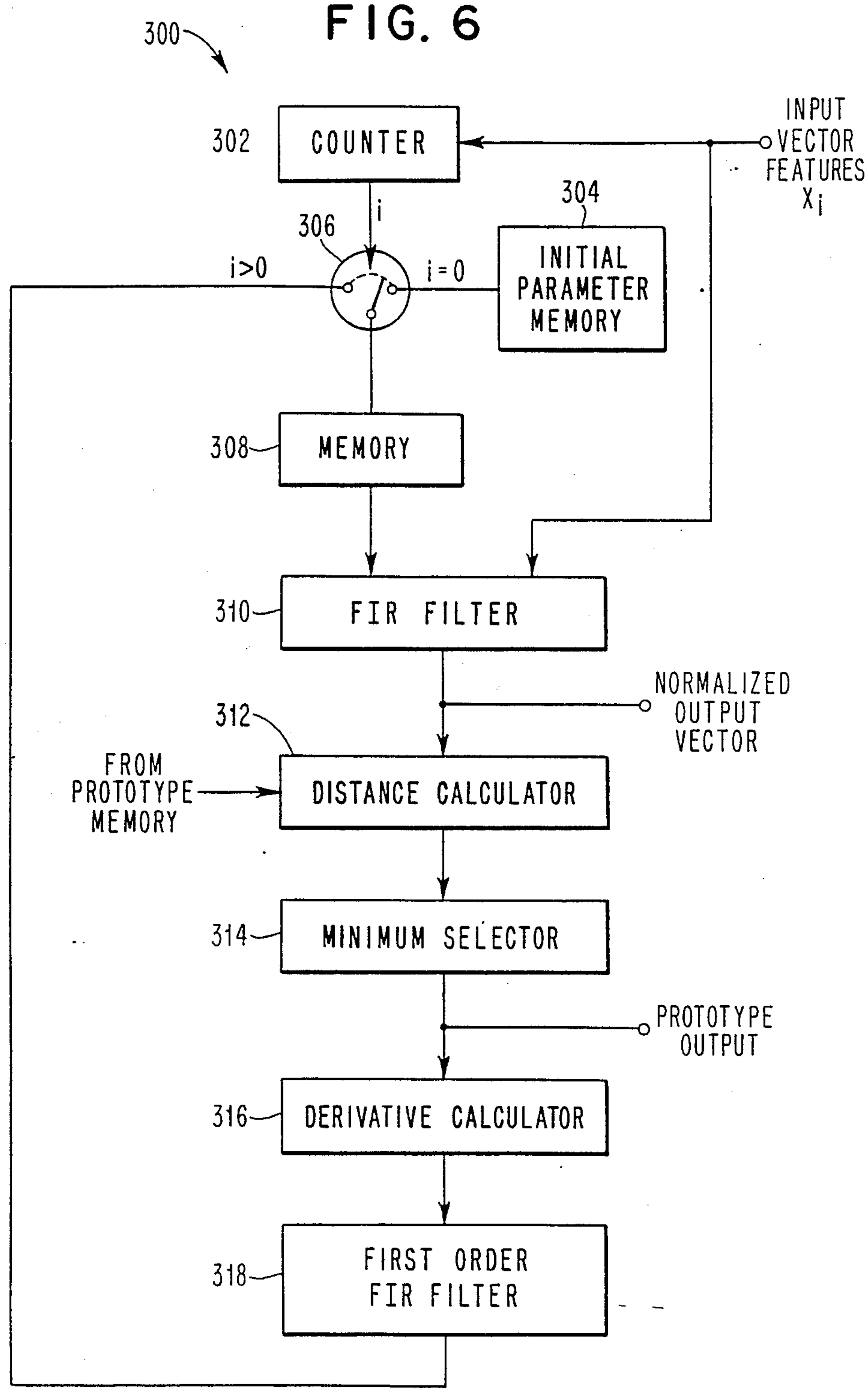
FIG. 6 is a block diagram showing a specific embodiment of an adaptive labeller according to the present invention.

FIG. 6 is a diagram illustrating a specific embodiment of an adaptive labeller 300 (see labeller 218 of FIG. 5). The input feature vectors $\vec{x}_i$ are shown entering a counter 302. The counter 302 increments with each time interval starting with $i=0$. At $i=0$, initial parameters are provided by memory 304 through switch 306 to a parameter storage memory 308. The input feature vector $\vec{x}_0$ enters an FIR filter 310 together with the stored parameter values. The FIR filter 310 applies the operator function $A_0$ to the input feature vector $\vec{x}_0$ as discussed hereinabove. (A preferred operator function is outlined in the description hereinbelow.) The normalized output vector $\vec{y}_0$ from the FIR filter 310 serves as an output of the adaptive labeller 300 and also as an input to distance calculator 312 of the labeller 300. The distance calculator 312 is also connected to the prototype memory (see FIG. 5). The distance calculator 312 computes the distance between each prototype vector and the normalized output vector $\vec{y}_0$. A minimum selector 314 associates the "closest" prototype vector with the normalized output vector $\vec{y}_0$. The closest prototype—as identified by a respective label—is output from the minimum selector 314 as the other output of the labeller 300.

The minimum selector 314 also supplies the output therefrom to a derivative calculator 316. The derivative calculator 316 determines the rate of change of the distance calculator equation with respect to parameters included in the operator function. By hill-climbing, the respective values for each parameter which tend to minimize the distance (and hence maximize the closeness of the normalized output vector $\vec{y}_0$ and the prototype associated therewith) are computed. The resultant values, which are referred to as up-dated parameter values, are generated by a first-order FIR filter 318, the output from which is directed to switch 306. At the next time interval, $i>0$. The up-dated parameter values enter the memory 308. With the entry of the input feature vector $\vec{x}_1$, the up-dated parameter values from memory 308 are incorporated into the operator function implemented by the FIR filter 310 to generate a normalized output vector $\vec{y}_1$. $\vec{y}_1$ exits the labeller 300 as the output vector following $\vec{y}_0$ and also enters the distance calculator 312. An associated prototype is selected by the minimum selector 314; the label therefor is provided as the next prototype output from the labeller 300. The parameters are again up-dated by means of the derivative calculator 316 and the filter 318.

Figure 7:
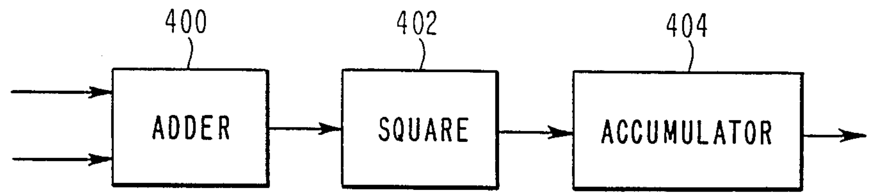
FIG. 7 is a diagram of a distance calculator element of FIG. 6.

Referring to FIG. 7, a specific embodiment of the distance calculator 312 is shown to include an adder 400 for subtracting the value of one frequency band of a given prototype vector from the normalized value of the same band of the output vector. In similar fashion, a difference value is determined for each band. Each resulting difference is supplied to a squarer element 402. The output of the squarer element 402 enters an accumulator 404. The accumulator 404 sums the difference values for all bands. The output from the accumulator 404 enters the minimum selector 314.

Figure 8:
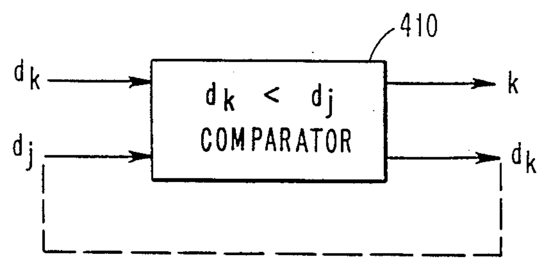
FIG. 8 is a diagram of a minimum selector element of FIG. 6.

FIG. 8 shows a specific minimum selector formed of a comparator 410 which compares the current minimum distance $d_j$ against the current computed distance $d_k$ for a prototype vector $P_k$. If $d_j<d_k$, $j=k$; otherwise j retains its value. After all distance computations are processed by the comparator 410, the last value for j represents the (label) prototype output.

Figure 9:
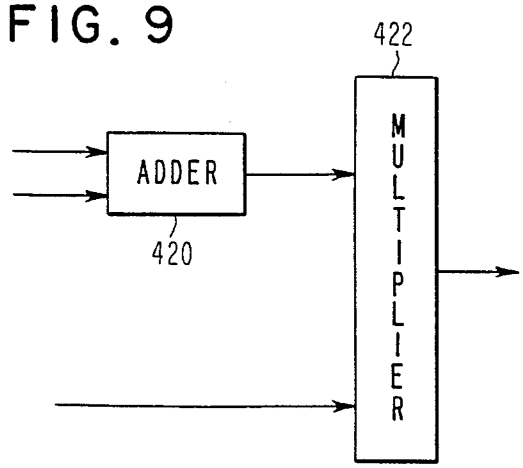
FIG. 9 is a diagram of a derivative calculator element of FIG. 6.

FIG. 9 shows a specific embodiment for the derivative calculator which includes an adder 420 followed by a multiplier 422. The adder 420 subtracts the associated prototype from the normalized output vector; the difference is multiplied in the multiplier 422 by another value (described in further detail with regard to FIG. 11).

Figure 10:
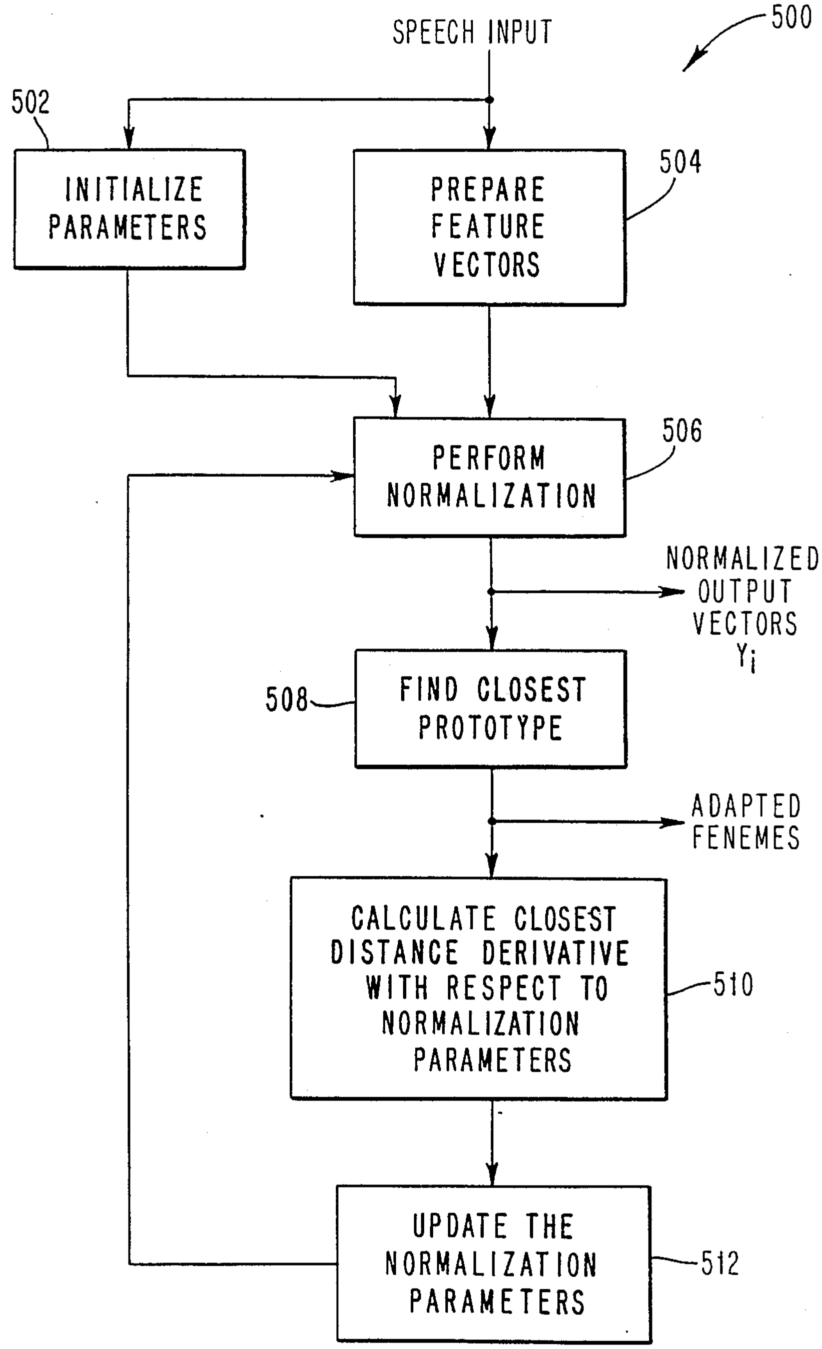
FIG. 10 is a flowchart generally illustrating the steps of adaptive labelling according to the present invention.

FIG. 10 is a general flow diagram of a process 500 performed by the adaptive labeller 300. Normalization parameters are initialized in step 502. Input speech is converted into input feature vectors in step 504. The input feature vectors $\vec{x}_i$ are transformed in step 506 into normalized vectors $\vec{y}_i$ which replace the input feature vectors in subsequent speech processing. The normalized vectors provide one output of the process 500. The closest prototype for each normalized vector is found in step 508 and the label therefor is provided as a second output of the process 500. In step 510, a calculation is made to determine the closest distance derivative with respect to each normalization parameter. In step 512, the normalization parameters are up-dated and incorporated into the operator function $A_i$.

Figure 11:
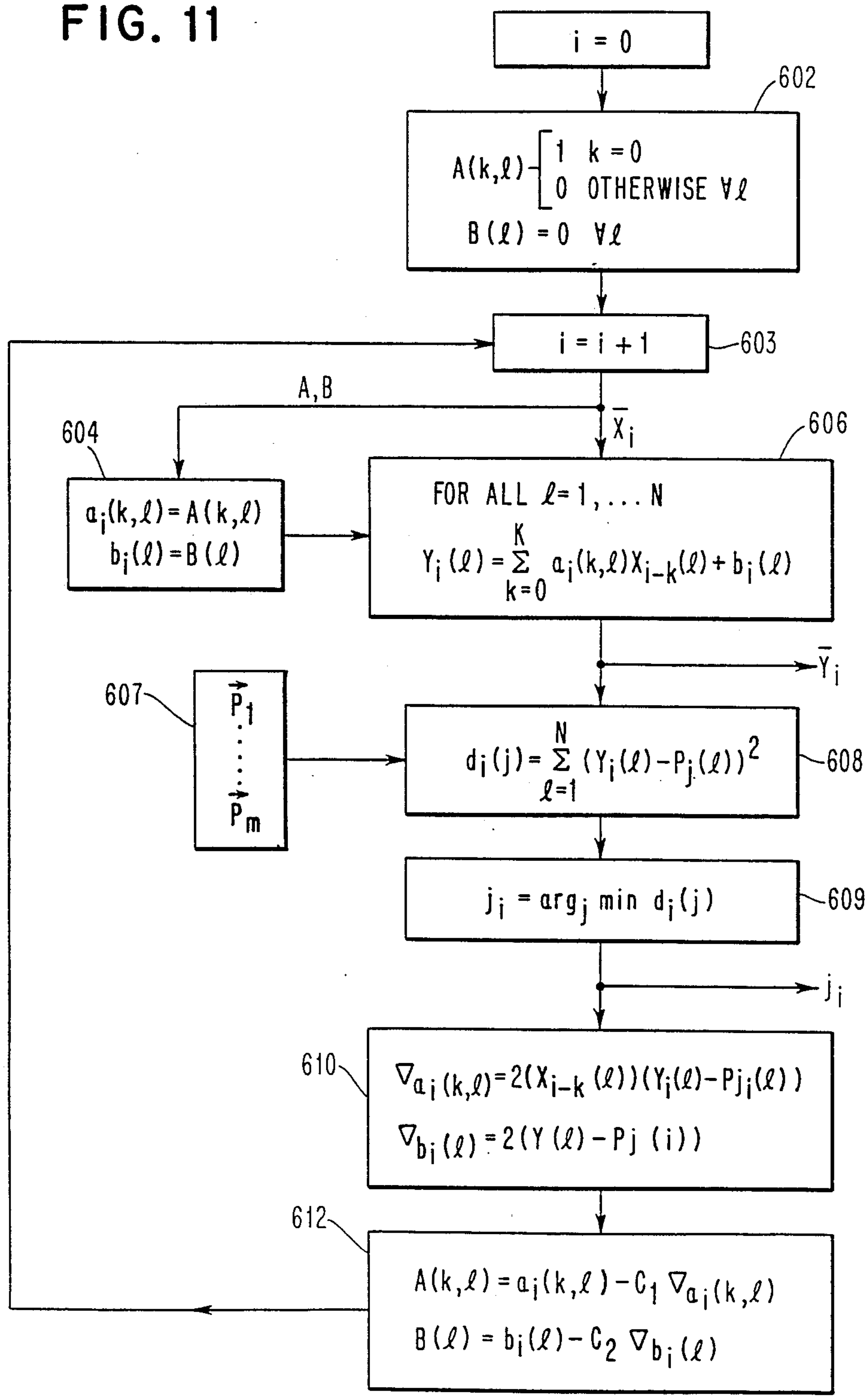
FIG. 11 is a specific flowchart illustrating the steps of adaptive labelling according to the present invention.

FIG. 11 further specifies the steps of FIG. 10. For the first time interval $i=0$, parameters $A(k,l)$ and $B(l)$ of function Ai are given initial values in initialization step 602. The time interval is incremented in step 603 and values for parameters $A(k,l)$ and $B(l)$ are stored as $a_i(k,l)$ and $b_i(l)$, respectively, in step 604. The input feature vector corresponding to the current time interval i enters normalization step 606. The normalization step 606, in the FIG. 11 embodiment, involves a linear operator Ai function of the form $Ax+B$ where A and B are parameter representations and x is a set of one or more recent input feature vectors occurring at or before time interval i. In FIG. 11, each component of the vector is affected by a set of A parameter values and one corresponding B value. I performing the transformation $$\vec{y}_i=A_i(x),$$

based on the A(k,l) and B (l) parameters, the index l in FIG. 11 corresponds to a vector component. The index k identifies the kth recent vector $x_{i-k}$. That is, if k=0, the current vector is identified; if k=1, the most recent previous vector is identified; and so on. The expression A(k,l) thus corresponds to the lth component of the kth vector. The operator function is completely defined by the (K+1)(N+1) parameters—see steps 606 and 608—of the form a(k,l) and b(l).

The result of step 606 is a normalized output vector $y_i$ which is more informative than the input feature vector $x_i$ corresponding thereto.

In step 607, prototype vectors $\vec{P}_j$ are supplied from storage to provide input to a distance calculation step 608. In step 608, the difference between the lth component of the normalized vector and the lth component of the jth prototype vector is determined for each of the N components; the squares of the differences being added to provide a distance measure for the jth prototype vector. Step 608 is repeated for each prototype vector $\vec{P}_j$(j =1, . . . ,m). In step 609, the prototype vector having the smallest computed distance is selected as the prototype associated with the normalized output vector. The prototype vector in the form of (a) its components or (b) a label (or feneme) identifying the prototype vector is provided as an output $j_i$.

In step 610, derivatives (or more precisely gradients) are calculated for the distance equation in step 608 with respect to each parameter $a_i(k,l)$ and $b_i(l)$ for the closest prototype. An up-dated value for each parameter is then computed as:

$$A(k,l)=a_i(k,l)-C_1\nabla_{a_i(k,l)}$$

for one parameter or $$B(l)=b_i(l)-C_2\nabla_{b_i(l)}$$

for the other parameter. The $\nabla$ operator corresponds to the derivative (i.e., gradient) function of step 610. The $c_1$ and $c_2$ values are constants which are preferably determined during the training period and are preferably fixed. Alternatively, however, the c values may be tailored to a particular speaker a desired. Moreover, if the well-known Hessian approach is used in the "hill-climbing" to provide a maximum closeness (or minimum distance value) with respect to each parameter, the c values are readily modified.

A series of experiments were conducted using loud and soft voices as well as environments in which the microphonespeaker distance was varied to produce gain variations. Employing standard labelling in four such experiments resulted in decoding error rates of 9%, 25%, 20%, and 18%, respectively. By applying the adaptive labelling approach of the present invention under the same four experimental conditions, error rates of 4%, 1.5%, 7%, and 3% were achieved. An average improvement of 80% in error rate and a reduction in decoding time by an average of 30% resulted from use of the present invention.

While the invention has been described with reference to a preferred embodiment thereof, it will be understood by those skilled in the art that various changes in form and details may be made without departing from the scope of the invention.

For example, the described embodiment is deterministic in nature. That is, a point (or vector) is transformed to another point (or vector) through adaptive normalization. The invention, however, also contemplates a probabilistic embodiment in which each prototype—rather than identifying a vector—corresponds to a probabilistic finite state machine PFSM (or Markov model). In the probabilistic embodiment, the closeness measure is based on the average likelihood over all states in the PFSM or, alternatively, is the likelihood of the final state probability. At time interval i=0, each PFSM is initialized. With each frame, the likelihoods at each state in each PFSM are up-dated. The sum of closeness measures for all PFSMs serves as the objective function. This sum is used in place of the distance measure employed in the deterministi embodiment.

In addition, the components of the feature vectors (and prototype vectors) may alternatively correspond to well-known (1) Cepstral coefficients, (2) linear predictive coding coefficients, or (3) frequency band-related characteristics.

Also, the present invention contemplates an operator function in which not only the parameters are up-dated but the form of the operator function is also adapted. By way of example, there may be a collection of operator expressions—one for each prototype. The effect of each operator expression may be weighted based on the distance computed for the prototype corresponding thereto. The composite of the combined weighted operator expressions then represents the operator function.

It is further noted that "closeness" preferably refers to the prototype of the defined set which is most probable according to the conditional probability p(i|x) in a mixture model for the distribution f(x) of the feature vector $$f(x)=\sum_{j=1}^{k}p_jf_j(x).$$

Thus $p(j|x)=p_jf_j/f(x)$ where $p_j$ is the marginal prototype of the jth prototype. The distributions (or prototypes) $f_j(x)$ are conditional probability densities for x given the label j. In the case of equally likely Gaussian densities with a common scale, the most probable prototype is simply the one with a mean vector $\mu_j$ which is closest to x in the sense of Euclidean distance:

$$d(x,\mu_j)=\sum_{v=1}^{m}[x(v)-\mu_j(v)]^2.$$

However, other definitions of "closeness" (which may be found in the prior technology) may also be employed.

We claim:

1. A speech coding apparatus comprising:

means for measuring the value of at least one feature of an utternace, said utternace occurring over a series of successive time intervals, said means measuring the feature value of the utterance during each time interval to produce a series of feature vector signals representing the feature values;

means for storing a plurality of prototype vector signals, each prototype vector signal having at least one parameter value and having a unique identification value;

means for generating a first modified feature vector signal having a modified feature value, said modified feature value being related, by a modification function, to the feature value of a first feature vector signal in the series of feature vector signals;

means for comparing the modified feature value of the first modified feature vector signal to the parameter values of the prototype vector signals to determine the associated prototype vector signal which is best matched to the first modified feature vector signal;

means for altering the modification function to improve the match between the modified feature vector signal and its associated prototype vector signal determined by the comparison;

means for generating a second modified feature vector signal having a modified feature value, said modified feature value of the second modified feature vector being related, by the altered modification function, to the feature value of a second feature vector signal in the series of feature vector signals, said second feature vector signal following the first feature vector signal;

means for comparing the modified feature value of the second modified feature vector signal to the parameter values of the prototype vector signals to determine the associated prototype vector signal which is best matched to the second modified feature vector signal; and means for outputting the identification value of the prototype vector signal associated with the second modified feature vector as a coded representation of the second feature vector signal.

2. An apparatus as claimed in claim 1, characterized in that the second feature vector signal immediately follows the first feature vector signal.

3. An apparatus as claimed in claim 2, characterized in that the modification function and the altered modification function normalize the feature vector signals.

4. An apparatus as claimed in claim 3, characterized in that each means for comparing determines the prototype vector signal which is closest to the modified feature vector signal.

5. A method of coding speech, said method comprising the steps of:

measuring the value of at least one feature of an utterance, said utternace occurring over a series of successive time intervals, the feature value of the utterance being measured during each time interval to produce a series of feature vector signals representing the feature values;

storing a plurality of prototype vector signals, each prototype vector signal having at least one parameter value and having a unique identification value;

generating a first modified feature vector signal having a modified feature value, said modified feature value being related, by a modification function, to the feature value of a first feature vector signal in the series of feature vector signals;

comparing the modified feature value of the first modified feature vector signal to the parameter values of the prototype vector signals to determine the associated prototype vector signal which is best matched to the first modified feature vector signal;

altering the modification function to improve the match between the modified feature vector signal and its associated prototype vector signal determined by the comparison;

generating a second modified feature vector signal having a modified feature value, said modified feature value of the second modified feature vector being related, by the altered modification function, to the feature value of a second feature vector signal in the series of feature vector signals, said second feature vector signal following the first feature vector signal;

comparing the modified feature value of the second modified feature vector signal to the parameter values of the prototype vector signals to determine the associated prototype vector signal which is best matched to the second modified feature vector signal; and outputting the identification value of the prototype vector signal associated with the second modified feature vector as a coded representation of the second feature vector signal.

6. A method as claimed in claim 5, characterized in that the second feature vector signal immediately follows the first feature vector signal.

7. A method as claimed in claim 6, characterized in that the modification function and the altered modification function normalize the feature vector signals.

8. An method as claimed in claim 7, characterized in that each step of comparing determines the prototype vector signal which is closest to the modified feature vector signal.

* * * * *